United States Patent
Black (10) Patent No.: US 8,488,654 B1
(45) Date of Patent: Jul. 16, 2013

(54) SPREAD SPECTRUM COMMUNICATIONS USING COMPLEX CHIP SEQUENCES

(75) Inventor: William C. Black, Ames, IA (US)

(73) Assignee: Northern Microdesign, Inc., Chapel Hill, NC (US)

( * ) Notice: Subject to any disclaimer, the term of this patent is extended or adjusted under 35 U.S.C. 154(b) by 897 days.

(21) Appl. No.: 12/565,225

(22) Filed: Sep. 23, 2009

Related U.S. Application Data (60) Provisional application No. 61/099,309, filed on Sep. 23, 2008.

(51) Int. Cl.
*H04L 5/16* (2006.01)

(52) U.S. Cl.
USPC .................................................. 375/219

(58) Field of Classification Search
USPC .......... 375/219, 146, 295, 233, 260; 370/335, 370/342, 442
See application file for complete search history.

(56) References Cited

U.S. PATENT DOCUMENTS

| | | | |
|---|---|---|---|
| 2004/0165686 A1* | 8/2004 | Siwiak | 375/350 |
| 2006/0285609 A1* | 12/2006 | Fisher et al. | 375/316 |
| 2008/0273586 A1* | 11/2008 | Naga Sailaja et al. | 375/233 |

* cited by examiner

*Primary Examiner* — Khai Tran
(74) *Attorney, Agent, or Firm* — McKee, Voorhees & Sease, P.L.C.

(57) ABSTRACT

A method for spread-spectrum communication includes forming a complex valued chipping sequence and then using the complex valued chipping sequence to spread or despread data. According to another method, a direct sequence spread spectrum (DSSS) radio performs the steps of receiving a radio-frequency signal and then identifying frequencies within the radio-frequency signal which are associated with noise sources. The DSSS radio then self-adjusts to reduce effects of the noise sources or to reduce interference created by the radio upon other communication channels.

17 Claims, 10 Drawing Sheets

| | | | | | | | | | | | | | | | | |
|---|---|---|---|---|---|---|---|---|---|---|---|---|---|---|---|---|
| 00009a1 | \0 | \0 | \0 | \0 | \0 | \0 | \0 | \0 | \0 | \0 | \0 | \0 | \0 | \0 | \0 | \0 |
| 00009b1 | \0 | \0 | \0 | \0 | \0 | \0 | \0 | \0 | \0 | \0 | \0 | \0 | \0 | \0 | \0 | \0 |
| 00009c1 | \0 | \0 | \0 | \0 | \0 | \0 | \0 | \0 | \0 | \0 | \0 | \0 | \0 | \0 | \0 | \0 |
| 00009d1 | \0 | \0 | \0 | \0 | \0 | \0 | \0 | \0 | \0 | \0 | \0 | \0 | \0 | \0 | \0 | \0 |
| 00009e1 | \0 | \0 | \0 | \0 | \0 | \0 | \0 | \0 | \0 | \0 | \0 | \0 | \0 | \0 | \0 | \0 |
| 00009f1 | \0 | \0 | \0 | \0 | \0 | \0 | \0 | \0 | \0 | \0 | \0 | \0 | \0 | \0 | \0 | \0 |
| 0000a01 | \0 | \0 | \0 | \0 | \0 | \0 | \0 | \0 | \0 | \0 | \0 | \0 | \0 | \0 | \0 | \0 |
| 0000a11 | \0 | \0 | \0 | \0 | \0 | \0 | \0 | \0 | \0 | \0 | \0 | \0 | \0 | \0 | \0 | \0 |
| 0000a21 | \0 | \0 | \0 | \0 | \0 | \0 | \0 | \0 | \0 | \0 | \0 | \0 | \0 | \0 | \0 | \0 |
| 0000a31 | \0 | \0 | \0 | \0 | \0 | \0 | \0 | \0 | \0 | \0 | \0 | \0 | \0 | \0 | \0 | 001 |
| 0000a41 | 001 | 001 | 001 | \0 | \0 | \0 | \0 | \0 | \0 | \0 | \0 | \0 | \0 | \0 | \0 | \0 |
| 0000a51 | \0 | \0 | \0 | \0 | \0 | \0 | \0 | \0 | \0 | \0 | \0 | \0 | \0 | \0 | \0 | \0 |
| 0000a61 | \0 | \0 | \0 | \0 | \0 | \0 | \0 | \0 | \0 | \0 | \0 | \0 | \0 | \0 | \0 | \0 |
| 0000a71 | \0 | \0 | \0 | \0 | \0 | \0 | \0 | \0 | \0 | \0 | \0 | \0 | \0 | \0 | \0 | \0 |
| 0000a81 | \0 | \0 | \0 | \0 | \0 | \0 | \0 | \0 | \0 | \0 | \0 | \0 | \0 | \0 | \0 | \0 |
| 0000a91 | \0 | \0 | \0 | \0 | \0 | \0 | \0 | \0 | \0 | \0 | \0 | \0 | \0 | \0 | \0 | \0 |
| 0000aa1 | \0 | \0 | 001 | 001 | 001 | \0 | \0 | \0 | \0 | \0 | \0 | \0 | \0 | \0 | \0 | \0 |
| 0000ab1 | \0 | \0 | \0 | \0 | \0 | \0 | \0 | \0 | \0 | \0 | \0 | \0 | \0 | \0 | \0 | \0 |
| 0000ac1 | \0 | \0 | \0 | \0 | \0 | \0 | \0 | \0 | \0 | \0 | \0 | \0 | \0 | \0 | \0 | \0 |
| 0000ad1 | \0 | \0 | \0 | \0 | \0 | \0 | \0 | \0 | \0 | \0 | \0 | \0 | \0 | \0 | \0 | \0 |
| 0000ae1 | \0 | \0 | \0 | \0 | \0 | \0 | \0 | \0 | \0 | \0 | \0 | \0 | \0 | \0 | \0 | \0 |
| 0000af1 | \0 | \0 | \0 | \0 | \0 | \0 | \0 | \0 | \0 | \0 | \0 | \0 | \0 | \0 | \0 | \0 |
| 0000b01 | \0 | \0 | \0 | \0 | \0 | \0 | \0 | \0 | \0 | \0 | \0 | \0 | \0 | \0 | \0 | \0 |
| 0000b11 | \0 | \0 | \0 | \0 | \0 | \0 | \0 | \0 | \0 | \0 | \0 | \0 | \0 | \0 | \0 | \0 |
| 0000b21 | \0 | \0 | \0 | \0 | \0 | \0 | \0 | \0 | \0 | \0 | \0 | \0 | \0 | \0 | \0 | \0 |
| 0000b31 | \0 | \0 | \0 | \0 | \0 | \0 | \0 | \0 | \0 | \0 | \0 | \0 | \0 | \0 | \0 | \0 |
| 0000b41 | \0 | \0 | \0 | \0 | \0 | \0 | \0 | \0 | \0 | \0 | \0 | \0 | \0 | \0 | \0 | \0 |

SPREAD SPECTRUM COMMUNICATIONS USING COMPLEX CHIP SEQUENCES

CROSS-REFERENCE TO RELATED APPLICATIONS

This application claims priority under 35 U.S.C. §119 to provisional application Ser. No. 61/099,309 filed Sep. 23, 2008, herein incorporated by reference in its entirety.

GRANT REFERENCE

This invention was made with government support under Contract No. W31P4Q-06-C-0221. The government has certain rights in the invention.

FIELD OF THE INVENTION

The present invention relates to radio communication, more particularly the present invention relates to cognitive radios and/or spread-spectrum communications.

BACKGROUND OF THE INVENTION

Cognitive Radios are aware of the wireless environment and will attempt to make use of unused or underused frequency bands for communication [1-5]. There are various problems associated with cognitive radios. A first problem relates to determining at which frequencies interference is occurring. Broadband radio methods, such as spread-spectrum modulation, spread relatively narrow-band signals over a much broader bandwidth. This spreading, usually via multiplication with a pseudo-noise (or pn) function in direct-sequence spread-spectrum (DSSS) methods, is reversed at the receiver to reconstruct the original signal. If one or more strong interferers are present, however, the receiver function may be significantly compromised. For example, we have observed that many powerline DSSS links suffer from especially shortwave radio interferers that are routinely seen to be 40+ dB above the noise floor whereas our DSSS signal is generally many dB below it in the absence of correlation gain. It is possible to somewhat alleviate the effects of these interferers by using higher degree sequences but this comes at the cost of reduced data rate. Another approach is to simply shift the center frequency so the interferers will appear out-of-band. For any of these approaches, however, it is important to identify at what frequencies these interfering signals are occurring. What is needed is a system and method for doing so and for better reducing the effects of any such interference.

Figure 3:
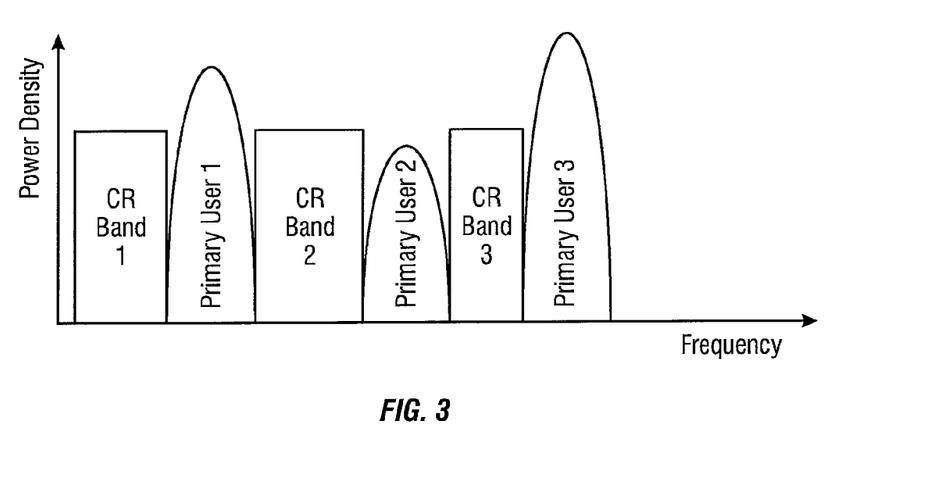
FIG. 3 illustrates a frequency overlay method.

Another problem associated with cognitive radios as well as more conventional radios is that in order to make use of unused or underused frequency bands for communication, transmissions are usually placed between bands used by existing users, which is sometimes referred to as frequency overlaying [2] and is illustrated in FIG. 3. The general problem of creating waveforms that are interspersed across potentially many frequencies and which may also change frequently is complicated at both the transmitter and the receiver. What is needed is a direct-sequence spread spectrum (DSSS) scheme that can be easily tailored to use a number of different frequency bands simultaneously.

BRIEF SUMMARY OF THE INVENTION

Therefore, it is a primary object, feature or advantage of the present invention to improve over the state of the art.

It is a further object, feature, or advantage of the present invention to provide a method and apparatus to identifying the frequencies of interfering signals.

Another object, feature, or advantage of the present invention is to provide a DSSS scheme that can be easily tailored to use a number of different frequency bands simultaneously.

These and/or other objects, features, or advantages of the present invention will become apparent from the specification and claim that follow. No single embodiment need achieve all or any of these objects, features or advantages.

According to one aspect of the present invention a method for spread-spectrum communication is provided. The method includes forming a complex valued chipping sequence wherein the chipping sequence comprises at least one fractional value.

According to another aspect of the present invention a radio system is provided. The radio system includes a demodulator for providing a demodulated signal and a correlator operatively connected to the demodulator and adapted for correlating a complex valued chipping sequence to the received radio signal. The demodulator may be a direct sequence spread spectrum (DSSS) demodulator. The radio system may include a processor configured for producing the complex valued chipping sequence. The complex valued chipping sequence comprises at least one fractional value.

According to another aspect of the present invention, a method for use in a cognitive radio is provided. The method includes identifying one or more frequency bands to modify. The method further includes forming a complex valued chipping sequence by (a) providing a pseudo-noise (pn) sequence, (b) performing a Fourier transform on the pn sequence to provide a plurality of bins, (c) modifying the plurality of bins, and (d) performing an inverse Fourier transform on the plurality of bins. The method further includes spreading data using the complex valued chipping sequence to produce a signal.

According to another aspect of the present invention, a method for communication includes forming a chipping sequence comprising at least one fractional value.

According to another aspect of the present invention, a method for using a cognitive radio includes receiving a radio-frequency signal, applying a Fast Fourier Transform (FFT) thresholding block to identify frequency bins exceeding a programmable power threshold, and adjusting the cognitive radio to reduce effects of noise sources. The step of adjusting the cognitive radio may include modifying a spreading sequence to reduce effects of noise sources or configuring a programmable filter to attenuate frequency content associated with the noise sources.

According to another aspect of the present invention, a method for a cognitive radio includes receiving a radio-frequency signal by the cognitive radio, identifying frequencies within the radio-frequency signal which are associated with noise sources, the step of identifying performed by the cognitive radio, and self-adjusting by the cognitive radio to reduce effects of the noise sources.

DETAILED DESCRIPTION OF THE PREFERRED EMBODIMENT

Figure 1:
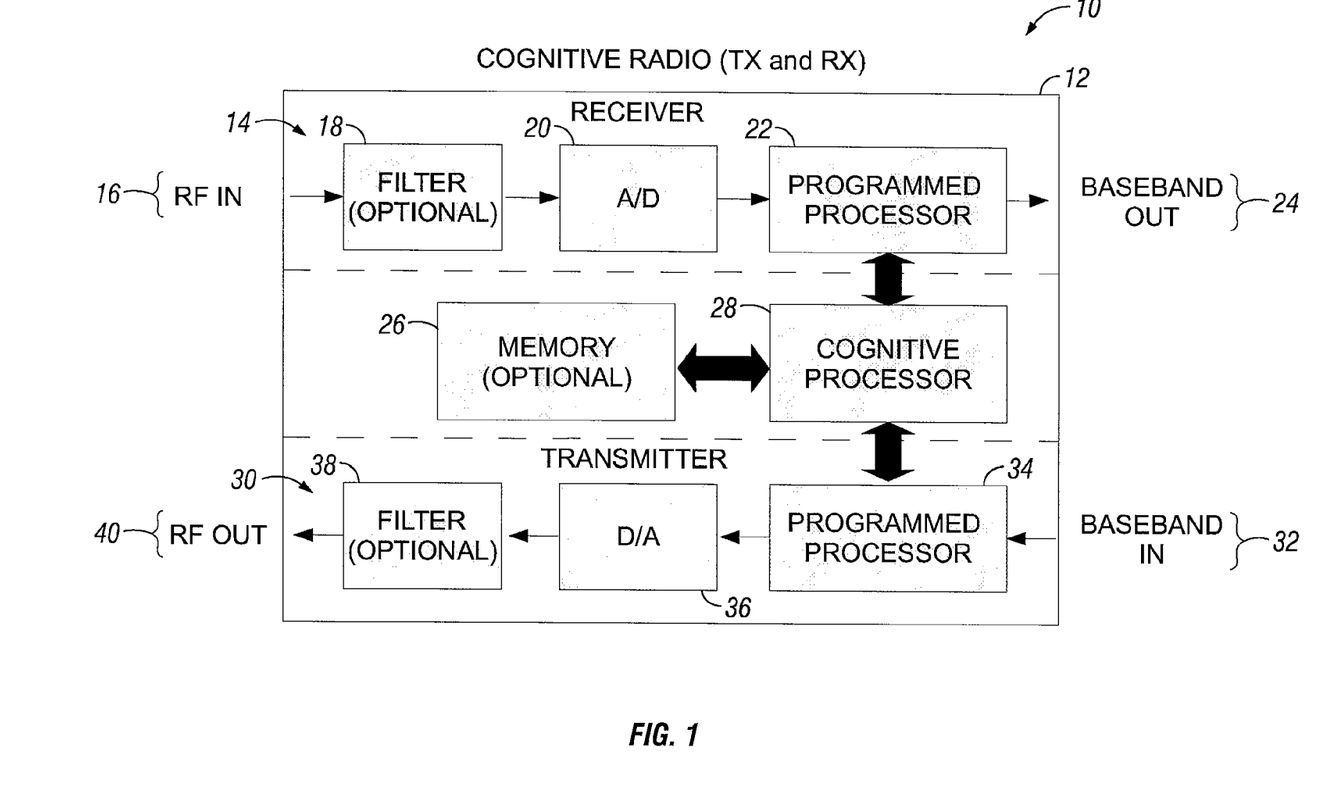
FIG. 1 is a block diagram illustrating one embodiment of a cognitive radio.

FIG. 1 illustrates one embodiment of a cognitive radio that performs both transmit and receive functions. The cognitive radio 10 may have a housing 12. Disposed within the housing 12 is a receiver 14 and a transmitter 30. A radio frequency input signal 16 is received and communicated to an optional filter 18. The resulting filtered signal (where a filter is used) is received at an analog-to-digital converter 20. After the conversion, the resulting signal is communicated to a programmed processor 22. The programmed processor 22 may generate a baseband output. The programmed processor 22 is in operative communication with a cognitive processor 28 which may be operatively connected to an optional memory 26. In the transmitter 30, a programmed processor 34 receives a baseband signal 32 as input. The programmed processor 34 is operatively connected to a digital-to-analog converter 36. The analog signal produced by the digital-to-analog converter 36 may be output through an optional filter 38 to provide a radio frequency output signal 40. Depending upon the embodiment, signal 40 may be further upconverted to higher RF frequencies and signal 16 may be downconverted from a higher frequency and these frequencies need not be the same. Although separate block are shown, such as for the programmed processor 22, the cognitive processor 28, and programmed processor 34, it is to be understood that a single device may provide the functions of multiple blocks as shown. The cognitive radio of FIG. 1 may provide for filter adjustments or modifying the spreading sequence based on an assessment of noise sources. The cognitive radio of FIG. 1 may also use complex valued chipping sequences for spreading data. These features will be further discussed later herein.

Figure 2:
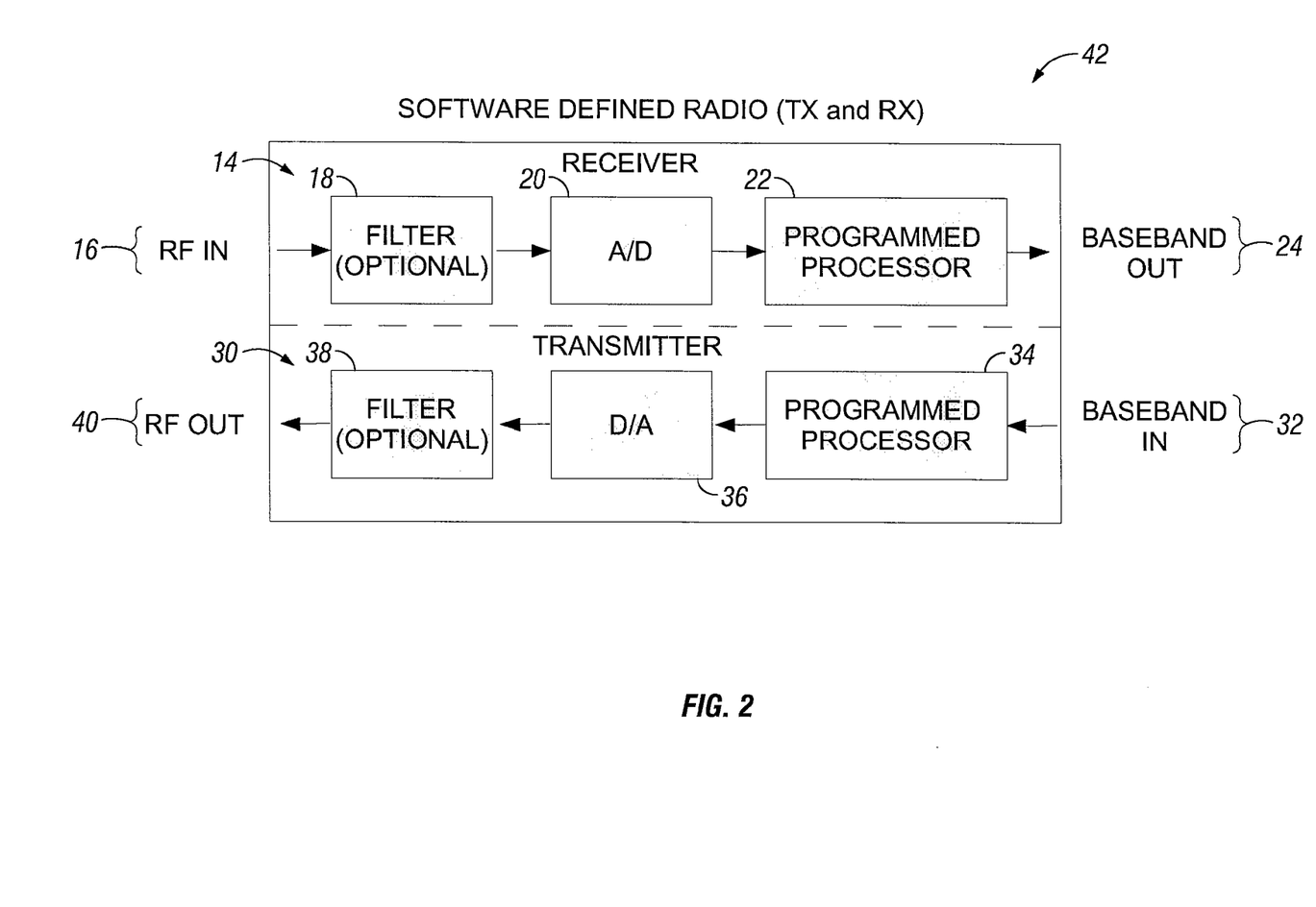
FIG. 2 is a block diagram illustrating one embodiment of a software defined radio.

FIG. 2 illustrates one embodiment of a software defined radio providing for both transmit and receive. The software defined radio 42 includes both a receiver 14 and a transmitter 30. The receiver 14 receives an input radio frequency signal 16 which passes through an optional filter 18. The resulting signal is received at the analog-to-digital converter 20 which produces a digital signal input into a programmed processor 22. The programmed processor produces a baseband output signal 24. The transmitter 30 receives a baseband input signal 32 at a programmed processor 34. The programmed processor produces a digital signal received at the digital-to-analog converter 36 which produces an analog signal. The analog signal is passed through the optional filter 38 to produce a radio frequency output signal 40. Depending upon the embodiment, signal 40 may be further upconverted to higher RF frequencies and signal 16 may be downconverted from a higher frequency and these frequencies need not be the same. The software defined radio of FIG. 2 may be a cognitive radio which provides for filter adjustments or modifying the spreading sequence based on an assessment of noise sources. The software defined radio may also use complex valued chipping sequence for spreading data.

Complex Valued Chipping Sequences

In a spread spectrum system a signal occupies a higher bandwidth than the minimum necessary for transmission of information. The baseband is spread through using a code that is independent of the data to be sent. Direct sequence is one type of technique where the data signal is multiplied by a coding signal. At the receiver, the original data signal is recovered by correlation of the received signal with a synchronized replica of the coding signal used to spread the baseband. The phasing of the coding signal at the receiver is adjusted so as to provide a maximum correlation which generally occurs when the receiver is properly synchronized with the transmitter.

To address this problem, we have developed a new direct-sequence spread spectrum (DSSS) scheme that can be easily tailored to use a number of different frequency bands simultaneously by using a customized chip sequence that is complex rather than real valued and may contain non-integer values. Transmission holes and peaks are simple to program and do not require computations more involved than a single inverse FFT prior to a complete reconfiguration.

DSSS communication methods employ a spreading function that effectively spreads the input signal over a wide bandwidth. This spreading sequence is normally comprised of a PN (pseudo-noise) sequence consisting of a Gold [6], Barker [7] or similar code, or Linear Feedback Shift Register (LFSR) derived sequence and typically consists of a repeating sequence consisting of only +1 and −1 values. The spreading sequence (often referred to as a sequence of chips) is typically used at a fast rate relative to the frequency of the input signal and for digital data transmission, one or more complete chip sequences may be used for each input symbol to be transmitted. The receiver, with advance knowledge of the spreading code used by the transmitter, repeats this process in the demodulator and effectively reconstructs the original signal when the receiver is synchronized with the transmitter. Because noise and interferers will typically not be correlated with the spreading sequence, it will tend to average out over a long spreading sequence resulting in a process gain that is a function of the length of the spreading sequence. (Gain~10 log 10(chips/input bit).)

Figure 4:
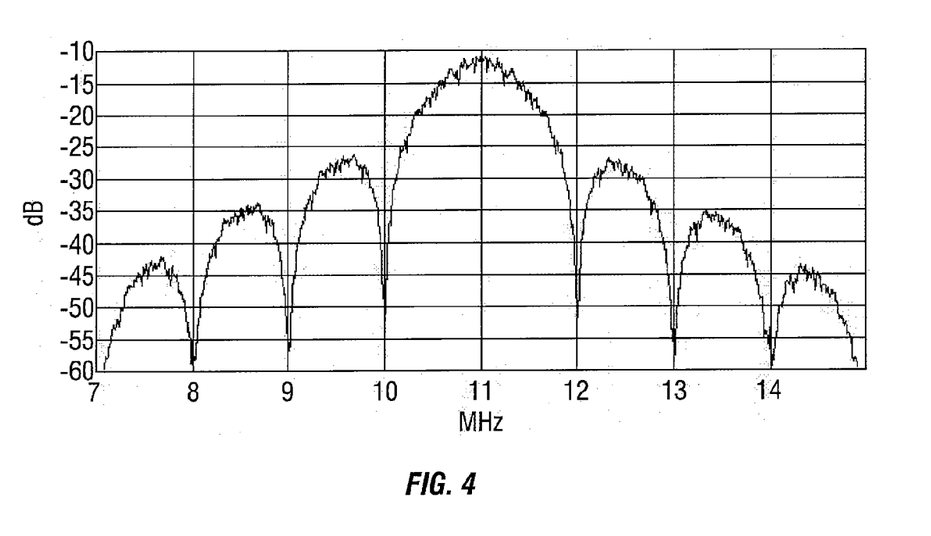
FIG. 4 illustrates output spectrum of a DSSS signal with a 1 MHz chip rate.

As is well known, PN sequences have a white or uniform frequency response resulting in a uniform but bell-shaped curve at the output of a DSSS modulator as shown in FIG. 4. Note that there is a main signal lobe and a number of reduced amplitude side-lobes. It may be desirable, however, to have a non-uniform spreading response in order to: (1) compensate for non-uniform channel performance, (2) avoid interfering with existing narrowband signals or (3) prevent interferers from degrading transmission performance. All of this goals can be accomplished by the scheme proposed here.

The basic premise of this scheme is that rather than using a Real chipping sequence composed of values of only +1 or −1, we actually use complex valued chips that may also be non-integer values. The advantage of this, is that nearly arbitrary frequency components may be included, or excluded, from the DSSS system response. Furthermore, the chips required to achieve these results are in many cases trivial to realize. As an example, the first 10 components of a 10th degree PN sequence are shown below, whose total length is $2^{10}-1$ or 1023 elements long:

chip-1fsr=1 -1 -1 1 -1 -1 1 -1 -1 1 . . .

Figure 5:
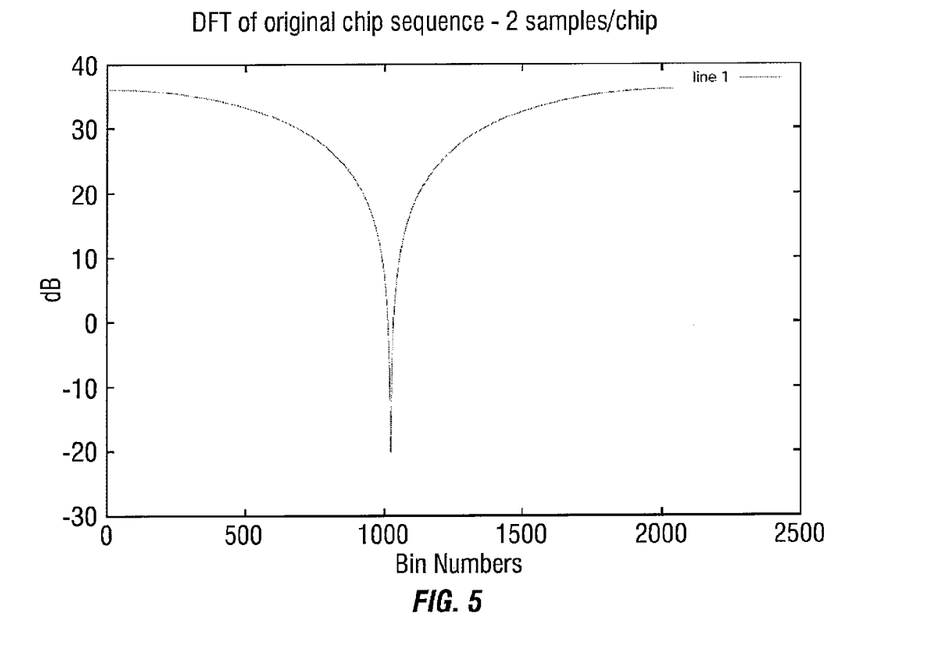
FIG. 5 illustrates a DFT of PN code at 2 samples/chip.
Figure 6:
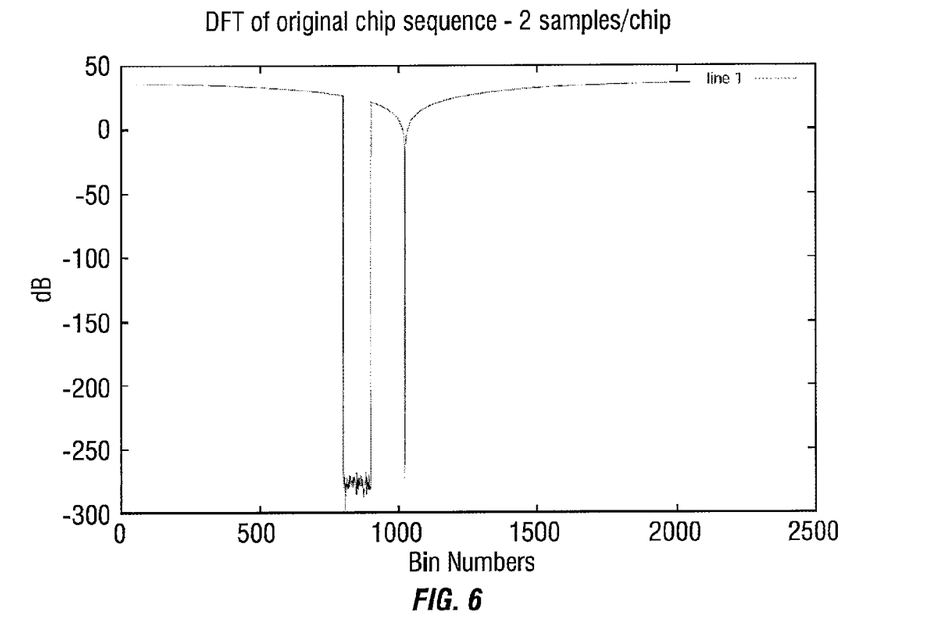
FIG. 6 illustrates a FFT of a modified chip sequence.
Figure 7:
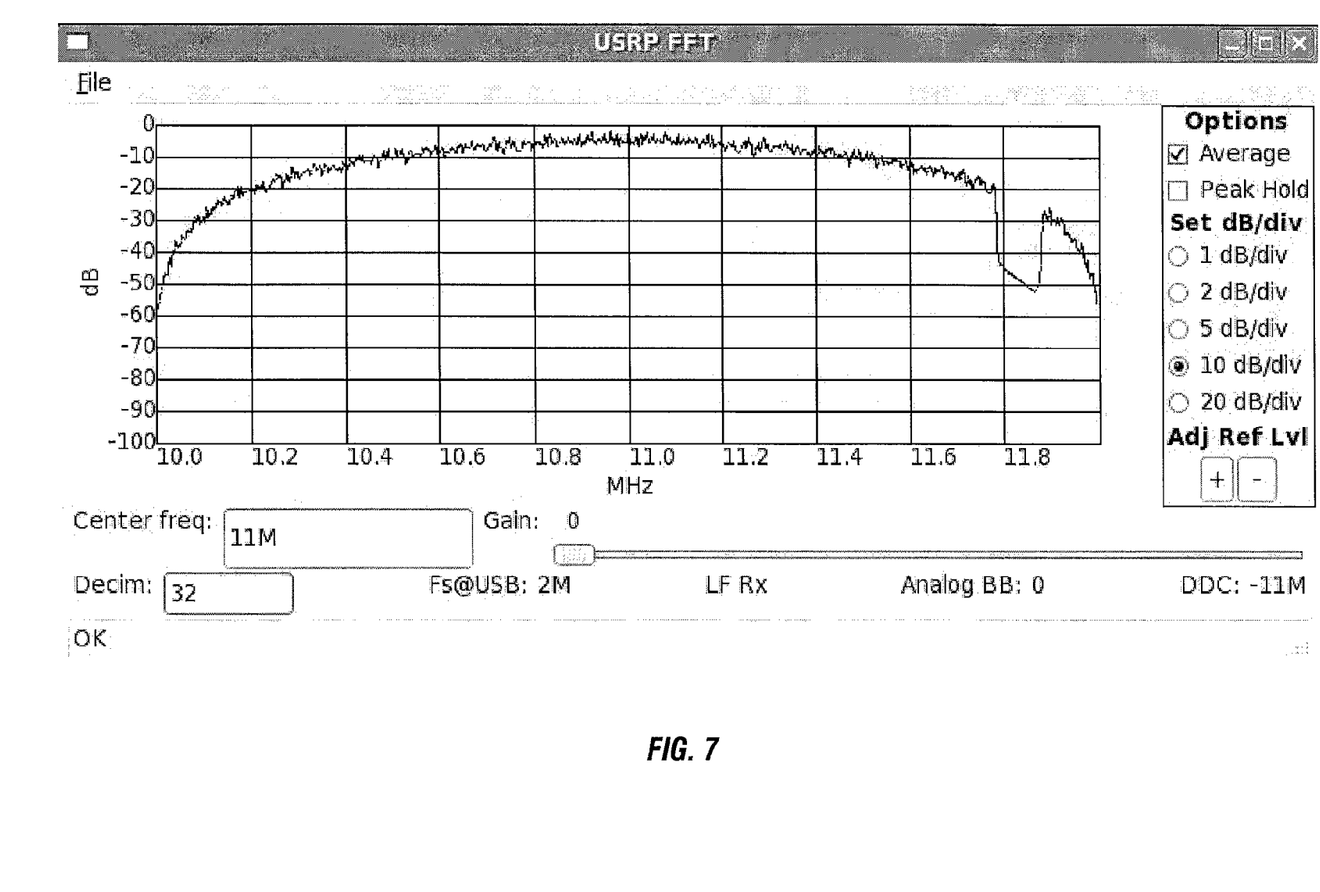
FIG. 7 illustrates a modulated DSSS main-lobe output using a modified chip sequence.
Figure 8:
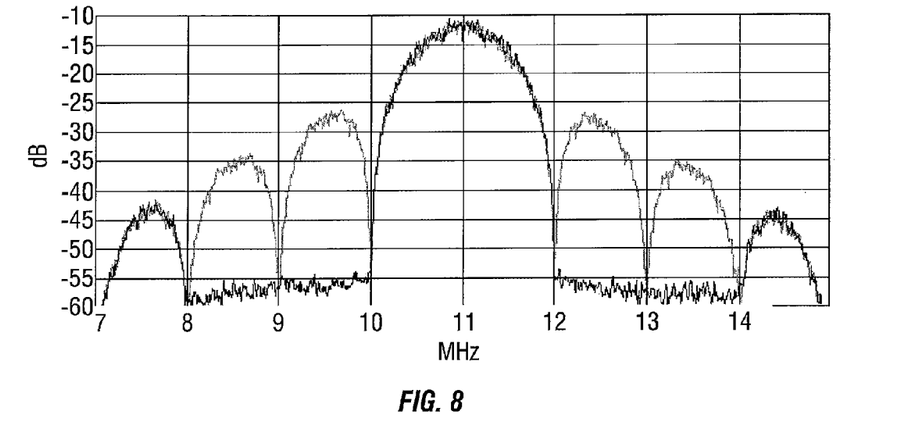
FIG. 8 illustrates a modulated DSSS main-lobe and reduced sidelobes via modified chip sequence and 4 samples/bit for reducing sidelobes
Figure 9:
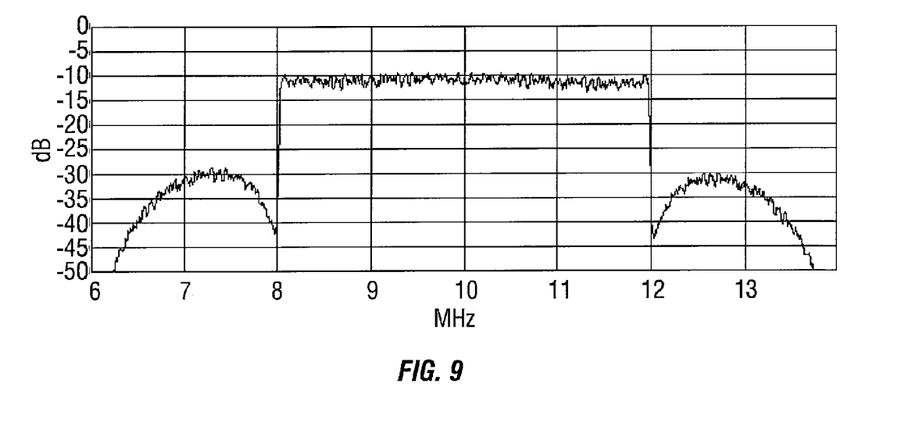
FIG. 9 illustrates a modulated DSSS main-lobe and adjacent sidelobe outputs using modified chip sequence and larger number of samples/chip to achieve sin(x)/x compensation without correction appearing in adjacent sidelobes.

We assume our system clocks twice per chip or element of the PN code, so each of the 1023 chips is used twice (or 1 1 -1 -1 -1 -1 1 1 . . . for the above sequence). As you would expect, the magnitude of the discrete Fourier transform (DFT) of this sequence is flat and there is a ((sin x)/x) type response as shown in FIG. 5 and FIG. 6. In the modulated output of the DSSS system, the left side of FIG. 5 will correspond to positive frequencies and the right side to negative frequencies of the main lobe with the pair of nulls around it separated by twice the chipping frequency. Let's assume that because of the presence of an existing transmitter, it is desirable to exclude a range of frequencies. We need simply set the transformed components to zero that correspond to this other transmitter and perform the inverse transform to find the spreading sequence. Thus, that is all that is needed to provide a simple and elegant solution. So, if we assume that we wanted to exclude use of bins 800-900 (out of the 2×1023 available), we find the new sequence by simply (in Matlab or Octave for example):

pn=makepn(2,1023); make or fetch pn sequence (2 s/chip and 1023 chips)

f=fft(pn); find fft or dft f(800:900)=0; zero out bins where no energy is desired mod_pn=ifft(f); modified chip sequence via inverse fft or dft Note that other channel compensations such as boosting or attenuating some frequency ranges may be accomplished in the same general way. A table showing the initial and modified values of the first 10 chips are shown in Table I. Note that the chip values are actually close to the original real values but now contain a usually small complex component. A resulting FFT of the modified chip sequence output is shown in FIG. 8 and an actual modulated output on an inexpensive SDR [8] is shown in FIG. 9, illustrating the desired result. Note that this technique may also be applied to other PN sequences that may contain both real and imaginary components, such as might be useful for certain modulation schemes such as quadrature phase shift keying.

TABLE I

Original and modified chips (first 10 elements)

| Original pn (1:10) | Real mod_pn (1:10) | Imag mod_pn (1:10) |
|---|---|---|
| +1 | +0.99257 | 0.02260i |
| +1 | +0.99246 | -0.01956i |
| -1 | -0.98336 | +0.00853i |
| -1 | -1.01656 | +0.00513i |
| -1 | -0.99218 | -0.01527i |
| -1 | -0.99445 | +0.01738i |
| +1 | +0.98231 | -0.01021i |
| +1 | +1.02306 | -0.00380i |
| -1 | -1.01857 | +0.01936i |
| -1 | -0.99530 | -0.03022i |

For the simple example above that used 2 samples per chip, shaping will appear on every other sideband; positive frequency shaping of the main-lobe will appear on odd numbered left sidebands and even numbered right sidebands whereas negative frequency shaping will appear on even numbered left sidebands and odd numbered right sidebands. In most cases, this will be undesirable. This problem can be simply addressed by using a larger number of samples per original chip and longer chip sequences and can either prevent shaping from applying to the sidebands or significantly reduce the amplitude of the sidebands without additional hardware. For example, a conventional DSSS output, shown as the upper trace in FIG. 8, has the desired main lobe but also significant sidelobes that are potential interferers to other users. By using a 4 sample/chip transmitter, however, and specifically setting the sideband components to zero, the adjacent pair of sidebands on each side of the main lobe can be greatly reduced as shown in the bottom trace in FIG. 8. This method allows even very exotic main lobe shaping without being significantly carried over into low-order sidebands. Note that the additional higher-order sidebands can be reduced by using a higher sampling to chip ratio.

Use of this technique within a radio requires that it include: (1) a table of complex chip values and/or a method of creating them as needed, (2) a complex signal path (e.g. I and Q) throughout the DSSS modulator and demodulator and (3) analog processing stages that are substantially linear or can be compensated to appear linear at the receiver input and transmit output. One of the realistic complications with this scheme is that it now depends upon linearity in the transmit and receive process to operate correctly. Nonlinearities introduced by either analog or digital means (including causes such as overflows or limited resolution) will tend to misshapen or limit the height or depth of desired peaks and holes and may make receiver synchronization difficult. In some implementations, use of the complex chips may require more resources, although most radios already posses I/Q signal paths that should allow simple injection of the now complex chips. Of course, implementations of this scheme may employ approximations of the forward and reverse DFT and may also include smoothing or other functions upon the chip sequence so as to minimize numerical artifacts or computational requirements.

Figure 10:
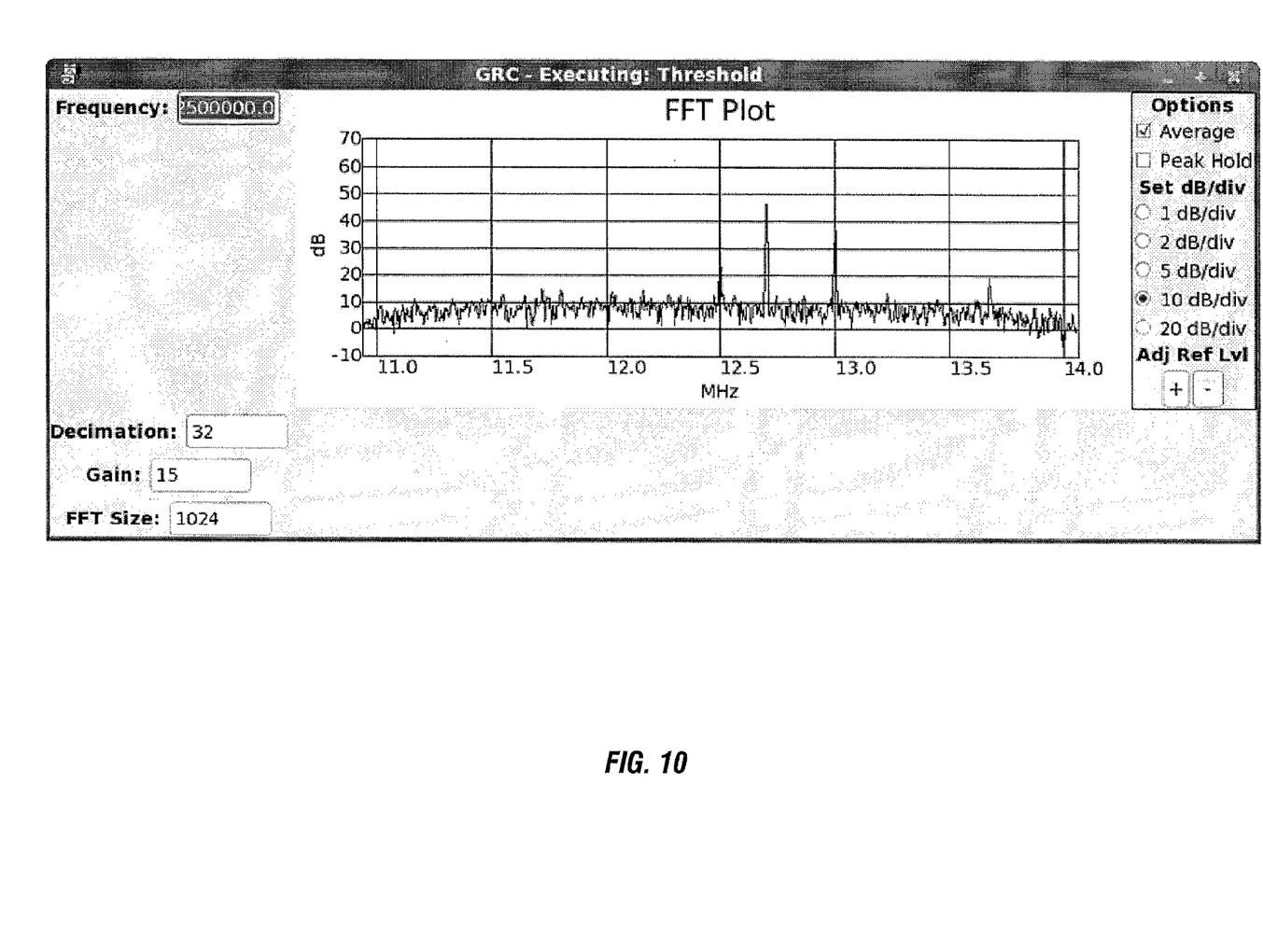
FIG. 10 illustrates the FFT of a powerline signal with a pair of particularly large noise sources.
Figure 11:
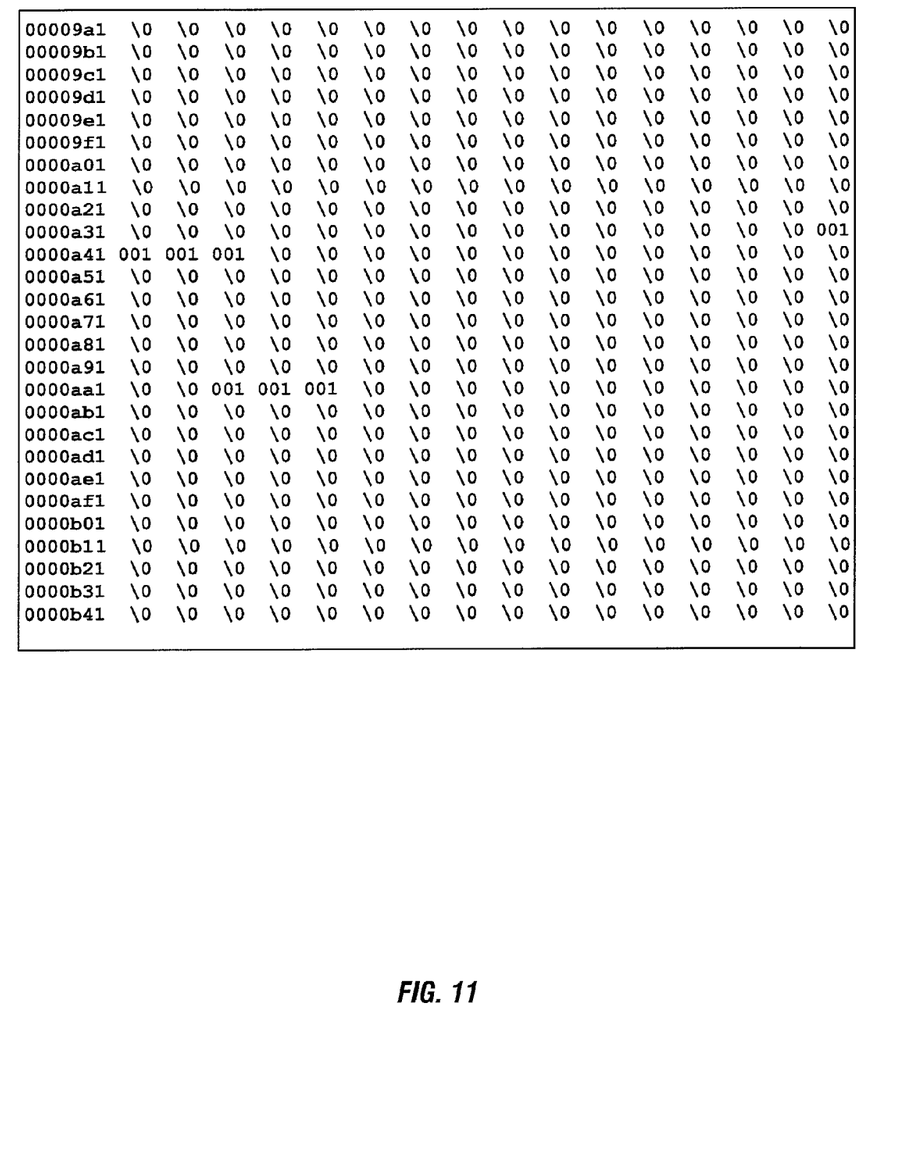
FIG. 11 illustrates a hexdump output that shows a portion of the thresholding block output identifying the largest bins.

Cognitive Spread-Spectrum Radio Method Employing Notch Filtering or Spreading Sequence Modification Another aspect of the present invention relates to identifying at what frequencies interfering signals occur. Using a modification of the available GNU Radio Companion (GRC) block sets we have developed a simple FFT thresholding block that identifies frequency bins that exceed a programmable power threshold. This tabular output can then be used to assess noise sources and adjust front-end or chip-based filter adjustments. An example of this block operation is shown in FIG. 10. In FIG. 10, the FFT of a powerline signal with a pair of particularly large noise sources (at approximately 12.7 MHz and 13.0 MHz) is illustrated. FIG. 11 illustrates the hexdump output with a portion of the thresholding block output identifying the largest bins.

Figure 12:
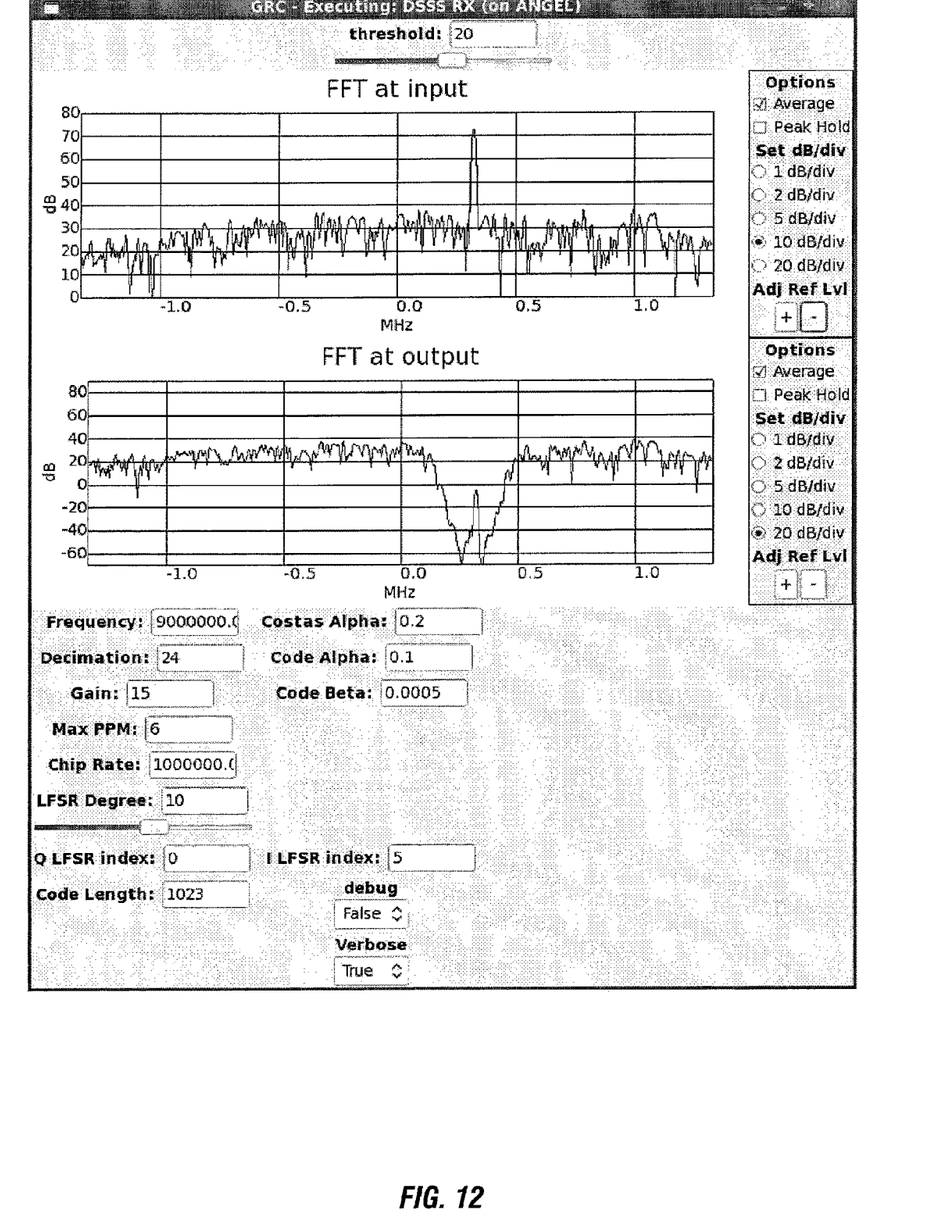
FIG. 12 illustrates the frequency content before and after a cognitive filter.

This information may be used to modify the spreading sequence to not use the frequency ranges with interferers or to create a notch function with an FIR or similar programmable filter in front of the DSSS receiver that attenuates the amplitude of the interference signal(s). An example of this is shown in FIG. 12 where the frequency content before and after this cognitive filter is presented. In this case, a 31 stage FIR filter largely removed the signal components around the interference frequency and there is very little consequence to the DSSS receiver function whereas without the filter the interference would significantly disrupt the receiver function. A block diagram of the cognitive FIR prefilter using GRC signal processing blocks is shown in FIG. 13.

Figure 13:
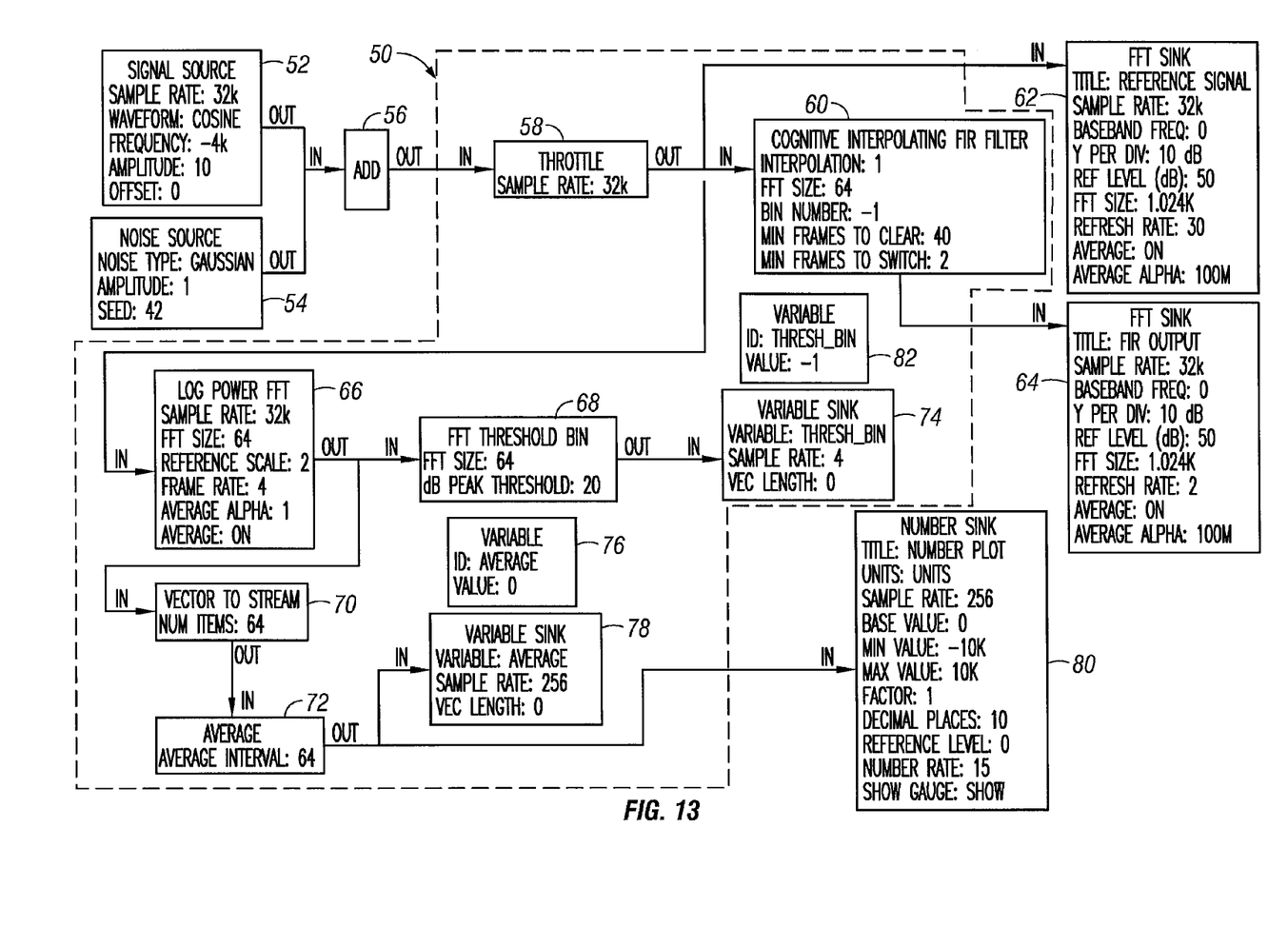
FIG. 13 is a block diagram of one embodiment of a cognitive FIR prefilter.

In FIG. 13, a cognitive FIR prefilter 50 is shown with a demonstrative test bench. A signal source block 52 is shown and is used to create a large narrowband signal whereas broadband noise source 54 creates background noise. Both sources are combined at adder 56 which input into a throttle block 58. An output from the throttle block 58 is received at the cognitive interpolating FIR filter 60, the FFT sink block 62, and the log power FFT 66. The output from the cognitive interpolating FIR filter block 60 is received at the FFT sink block 64. The output from the log power FFT 66 is received at a FFT threshold bin 68 and a vector to stream block 70. The output from the FFT threshold bin 68 is received at a variable sink 74 which in turn, modifies the filter coefficients within FIR block 60 so as to provide one or more nulls near the largest interferer frequencies when they exceed a threshold value. The output of the log power FFT 66 is received at a vector to stream block 70. The output of the vector to stream block 70 is received at an average block 72. The output of the average block 72 is received at a variable sink block 78. A variable block 76 is shown. The output of the average block 72 is also received as an input to the number sink block 80. When used within a DSSS receiver, the FIR filter 50 largely removed the signal components around the largest interference frequency with little effect on the DSSS receiver function. Thus, in the radio of FIG. 1, the filter block 18 may include the FIR filter 50 to remove the signal components around the interference frequency.

Thus, according to this aspect of the present invention, once noise sources are assessed, filter adjustments may be made to remove the signal components around an interference frequency. The filtering performed may simply be a programmable notch filter as shown with an FIR or similar programmable filter that attenuates the amplitude of the interference signal(s). Alternatively, the spreading sequence may be modified so as not to use the frequency ranges with interferers.

It is to be further understood that a cognitive radio which provides for filter adjustments or modifying the spreading sequence based on an assessment of noise or other signal sources, may also use the complex valued chipping sequence for spreading data. Such a system may achieve advantages with respect to avoiding disruptions associated with noise sources by modifying the spreading sequences and have greater flexibility in modifying the spreading sequences due to the use of complex valued chipping sequences or fractional valued chipping sequences. Thus, the present invention contemplates embodiments which combine both of these aspects.

Therefore methods, apparatuses, and systems associated with spread-spectrum communications have been described. The present invention is not to be limited to the specific embodiments described herein as the present invention contemplates variations, options, and alternatives.

REFERENCES

The following references are herein incorporated by reference in their entirety.
1. N. Mandayam "Cognitive Radio Research in the U.S.: Overview, Challenges and Directions" ARIB Frequency Resource Development Symposium, Tokyo, Japan, Jun. 8, 2007.
2. V. Chakravarthy, Z. Wu, A. Shaw, M. A. Temple, R. Kannan and F. Garber, "A General Overlay/Underlay Analytic Expression Representing Cognitive Radio Waveform," IEEE International Waveform Diversity and Design Conference, Jun. 4-8, 2007, Pisa, Italy.
3. R. W. Tomas, D. H. Friend, L. A. DaSilva, A. B. Mackenzie, "Adaptation and Learning to Achieve End-to-End Performance Objectives," IEEE Communication Magazine, December 2006.
4. S. M. Mishra, R. Tandra, A. Sahai, "Coexistence with Primary Users of Different Scales," IEEE DySpan Conference, Dublin, Ireland, Apr. 17-20, 2007.
5. James Neel, "Networking Cognitive Radios," Presented at 17th Virginia Tech Wireless Symposium, Jun. 6-8, 2007.
6. Gold, R., "Optimal binary sequences for spread spectrum multiplexing (Corresp.)," *IEEE Transactions on Information Theory*, vol. 13, no. 4, pp 619-621, 1967.
7. Barker, R. H. "Group Synchronizing of Binary Digital Sequences." In *Communication Theory*. London: Butterworth, pp. 273-287, 1953.
8. Ettus Research USRP system. See: http://www.ettus.com

What is claimed is:

1. A method for communication, comprising:
    forming a complex valued chipping sequence having at least one individual chip comprising both a nonzero real and a nonzero complex component, wherein the chipping sequence comprises at least one fractional value;
    producing a signal using the complex valued chipping sequence; and
    transmitting the signal using a signal transmitting device.

2. The method of claim 1 further wherein the step of producing the signal using the complex valued chipping sequence comprises spreading data using the complex valued chipping sequence.

3. The method of claim 2 further comprising:
    receiving the signal at a receiver;
    despreading the signal to provide a demodulated signal; and
    extracting the data from the demodulated signal.

4. The method of claim 3 wherein the despreading is performed using a correlator to correlate the complex valued chipping sequence to the received signal.

5. The method of claim 1 wherein the forming the complex valued chipping sequence is performed using a look up table.

6. The method of claim 1 wherein the forming the complex valued chipping sequence comprises providing a pseudo-noise (pn) sequence, performing a Fourier transform on the pn sequence, excluding bins where no energy is desired, and performing an inverse Fourier transform.

7. The method of claim 1 wherein the method of communication is performed using as cognitive radio.

8. The method of claim 7 wherein the cognitive radio is programmed to identify one or more interference frequencies and notch filter out the one or more interference frequencies.

9. The method of claim 7 wherein the cognitive radio is programmed to identify one or more interference frequencies and to modify the chipping sequence to avoid effects of the one or more interference frequencies.

10. A method comprising:
    identifying one or more frequency bands to modify;
    forming a complex valued chipping sequence by (a) providing a pseudo-noise (pn) sequence, (b) performing a first algorithm on the pit sequence to provide a plurality of bins, (c) modifying the plurality of bins, and (d) performing a second algorithm on the plurality of bins;
    spreading data using the complex valued chipping sequence to produce a signal with the signal within the identified frequency bands modified by the complex valued chipping sequence; and
    transmitting the signal using a signal transmitting device.

11. The method of claim 10 wherein the modifying the plurality of bins includes one or more from the set consisting of (a) decreasing amplitude associated with one or more of the bins, and (b) setting one or more of the bins to zero.

12. The method of claim 10 wherein the modifying the plurality of bins includes increasing amplitude associated with one of more of the bins.

13. The method of claim 10 wherein the first algorithm is a Fourier transform and the second algorithm is an inverse Fourier transform.

14. The method of claim 10 wherein the modifying of the plurality of bins provides for equalization in channels.

15. A method for communication, comprising:
identifying one or more frequencies to boost or attenuate;
forming a complex valued chipping sequence having at least one individual chip comprising both a nonzero real and a nonzero complex component to boost ear attenuate the one or more frequencies:
producing a signal using the complex valued chipping sequence; and
transmitting the signal using a signal transmitting device.

16. A method for communication, comprising:
identifying one or more frequencies to boost or attenuate;
forming a chipping sequence comprising at least one fractional value to boost or attenuate the one or more frequencies;
producing a signal using the chipping sequence; and
transmitting the signal using a signal transmitting device.

17. A method comprising:
forming a complex valued chipping sequence by (a) providing a pseudo-noise (pn) sequence, (b) performing a first algorithm on the pn sequence to provide a plurality of bins, (c) modifying the plurality of bins to provide for equalization, and (d) performing a second algorithm on the plurality of bins;
spreading data using the complex valued chipping sequence to produce a signal with frequency bands modified by the complex valued chipping sequence to provide for channel equalization; and
transmitting the signal using a signal transmitting device.

\* \* \* \* \*

UNITED STATES PATENT AND TRADEMARK OFFICE
CERTIFICATE OF CORRECTION

PATENT NO. : 8,488,654 B1
APPLICATION NO. : 12/565225
DATED : July 16, 2013
INVENTOR(S) : William C. Black Page 1 of 1

It is certified that error appears in the above-identified patent and that said Letters Patent is hereby corrected as shown below:

In the Claims

Col. 8, Claim 10, Line 56:
DELETE after the "pit"
ADD after the --pn--

Col. 9, Claim 15, Line 13:
DELETE after boost "ear"
ADD after boost --or--

Signed and Sealed this
Third Day of September, 2013

Teresa Stanek Rea
*Acting Director of the United States Patent and Trademark Office*